US011598866B2

(12) United States Patent
Sleasman et al.

(10) Patent No.: US 11,598,866 B2
(45) Date of Patent: Mar. 7, 2023

(54) SINGLE-FREQUENCY DYNAMIC METASURFACE MICROWAVE IMAGING SYSTEMS AND METHODS OF USE

(71) Applicant: Duke University, Durham, NC (US)

(72) Inventors: Timothy Sleasman, Takoma Park, MD (US); Laura Pulido Mancera, Durham, NC (US); Jonah Gollub, San Diego, CA (US); Michael Boyarsky, Durham, NC (US); Thomas Fromenteze, Durham, NC (US); Seyedmohammadreza Faghih Imani, Durham, NC (US); David R. Smith, Durham, NC (US)

(73) Assignee: Duke University, Durham, NC (US)

( * ) Notice: Subject to any disclaimer, the term of this patent is extended or adjusted under 35 U.S.C. 154(b) by 940 days.

(21) Appl. No.: 16/436,037

(22) Filed: Jun. 10, 2019

(65) Prior Publication Data
US 2019/0377084 A1 Dec. 12, 2019

Related U.S. Application Data

(63) Continuation of application No. PCT/US2017/065711, filed on Dec. 12, 2017.

(60) Provisional application No. 62/433,344, filed on Dec. 13, 2016.

(51) Int. Cl.
| *G01S 13/42* | (2006.01) |
| *G01S 7/03* | (2006.01) |
| *G01S 7/35* | (2006.01) |
| *G01S 13/36* | (2006.01) |
| *G01S 13/88* | (2006.01) |
| *G01S 13/89* | (2006.01) |
| *H01Q 3/26* | (2006.01) |
| *G01S 13/34* | (2006.01) |

(Continued)

(52) U.S. Cl.
CPC .............. *G01S 13/42* (2013.01); *G01S 7/03* (2013.01); *G01S 7/032* (2013.01); *G01S 7/352* (2013.01); *G01S 13/34* (2013.01); *G01S 13/36* (2013.01); *G01S 13/888* (2013.01); *G01S 13/89* (2013.01); *H01Q 3/26* (2013.01); *H01Q 3/2611* (2013.01); *H01Q 21/0018* (2013.01); *G01S 7/023* (2013.01); *G01S 7/356* (2021.05)

(58) Field of Classification Search
None
See application file for complete search history.

(56) References Cited

U.S. PATENT DOCUMENTS

| 6,018,306 A | 1/2000 | Serbin |
| 2006/0214832 A1 | 9/2006 | Lee et al. |

(Continued)

*Primary Examiner* — Whitney Moore
(74) *Attorney, Agent, or Firm* — Kory D. Christensen (57) ABSTRACT

A single frequency, or very narrow frequency band, microwave imaging system is described herein. A microwave imaging system can include an array transmitter; an array receiver; and a computing device that receives signals detected from the array receiver, transforms the signals received by the array receiver into independent spatial measurements, constructs an image using the independent spatial measurements, and outputs a reconstructed image. The array transmitter and the array receiver may each have a plurality of independently controllable metasurface resonant elements.

39 Claims, 10 Drawing Sheets

(51) Int. Cl.
　　　*H01Q 21/00*　　　(2006.01)
　　　*G01S 7/02*　　　(2006.01)

(56) References Cited

U.S. PATENT DOCUMENTS

| | | |
|---|---|---|
| 2010/0117885 A1* | 5/2010 | Holbrook ................ G01S 13/89 342/22 |
| 2013/0082858 A1 | 4/2013 | Chambers et al. |
| 2016/0025914 A1 | 1/2016 | Brongersma et al. |
| 2017/0336506 A1* | 11/2017 | Corcos .................. G01S 13/878 |
| 2018/0364351 A1* | 12/2018 | Weichman .............. G01S 13/90 |

* cited by examiner

$\bar{k} = \sum_i a_i \hat{k}_x + b_i \hat{k}_y$

SINGLE-FREQUENCY DYNAMIC METASURFACE MICROWAVE IMAGING SYSTEMS AND METHODS OF USE

CROSS-REFERENCE TO RELATED APPLICATION

This is a continuation of PCT App. No. PCT/US017/065711, filed Dec. 12, 2017, which claims the benefit of U.S. Provisional Application Ser. 62/433,344, filed on Dec. 13, 2016, both of which are hereby incorporated by reference in their entireties.

GOVERNMENT SUPPORT

This invention was made with government support under Federal Grant No. FA9550-12-1-0491 awarded by the USAF/AFOSR. The U.S. Government has certain rights in this invention.

BACKGROUND

Microwave imaging systems provide unique sensing capabilities that are advantageous for a variety of applications, including biomedical diagnostics, security scanning, through-wall imaging, and synthetic aperture radar. Features of microwave imaging systems include the ability to construct three-dimensional (3D) images, the ability to penetrate optically opaque materials, and the use of non-ionizing electromagnetic radiation.

Conventional microwave imaging systems generally rely on frequency bandwidth to retrieve range information, using mechanical movement or electronic beamsteering to obtain cross-range information using backscatter measurements. While these systems can produce excellent images, these systems often include complex, expensive, and power-intensive hardware. Additionally, relying on bandwidth can create difficulties in calibration, alignment, and imaging of dispersive objects.

SUMMARY

Single-frequency dynamic metasurface microwave imaging systems and methods of use are described herein. A single-frequency dynamic metasurface microwave imaging system can include an array transmitter, an array receiver, and a computing device that receives signals detected from the array receiver, transforms the signals received by the array receiver into independent spatial measurements, constructs an image using the independent spatial measurements, and outputs the image. The array transmitter and the array receiver feature a plurality of independently controllable, subwavelength, metasurface resonant elements that each contain at least one tunable component, such as a PIN diode, varactor, transistor, or other semiconductor device. Additional control circuitry, to modulate each tunable component, enables independent control of each element. A plurality of transmit radiation patterns and a plurality of reception patterns can be configured using the control circuitry. Each radiation pattern output by the array transmitter can be generated by inserting a single frequency, or very small bandwidth, microwave signal to the array transmitter. Alternatively, the array transmitter and array receiver can both be phased arrays or other array antenna hardware such as those with tunable components.

A method to operate the microwave imaging system includes dynamically controlling a tuning of radiation patterns of the array transmitter and array receiver, receiving, via the array receiver, a signal corresponding to each of the radiation patterns generated by the array transmitter, transforming the signals received by the array receiver into independent spatial measurements in computational processing, constructing an image using the independent spatial measurements, and outputting the image.

The system can dynamically control the tuning of the radiation patterns by using control circuitry to adjust each element to be either on or off, or to adjust the phase and/or amplitude of the elements. Receiving a signal corresponding to each of the radiation patterns generated by the array transmitter can include sampling the signal to generate a complex number for each transmit/receive pair for the full radiation pattern. Transforming the signals can include emulating a particular radiation pattern in which a single element is operated at a time to generate the independent spatial measurements that when combined, correspond to the received signal. The total number of independent spatial measurements is equal to a total number of independently controllable metasurface resonant elements within the array transmitter multiplied by a total number of independently controllable metasurface resonant elements within the array receiver, though more measurements can be taken to improve the quality of the processing and reconstruction. The step of constructing an image using the independent spatial measurements can include applying the Range Migration Algorithm (RMA). The RMA can use, for example, a Fast Fourier Transform (FFT). The output of the construction step is the reconstructed image.

Alternatively, rather than performing pre-processing to transform the signals into independent spatial measurements and then RMA to reconstruct the image, a collection of complex numbers can be fed into a matrix equation and then solved.

BRIEF DESCRIPTION OF DRAWINGS

FIGS. 7A and 7B show an example implementation of a dynamically tunable metasurface array antenna for both transmit and receive, while

DETAILED DESCRIPTION

Single-frequency microwave imaging systems and methods of use are described herein. An approach to microwave imaging using electrically large, dynamically reconfigurable metasurface antennas with simplified post-processing is presented herein. As used herein, "electrically large" is with respect to the operating wavelength and, based on operating wavelength of current systems, would be larger than 5 free space wavelengths for such systems.

The described imaging system can provide advantages over conventional wide bandwidth microwave imaging systems. For example, the described imaging systems utilize single-frequency signals, which minimizes interference with other electronic devices, can prevent issues with spectrum allotment, and can reduce the need for complicated and time-consuming processing techniques. In addition, single-frequency signals can be easier to model when imaging through materials such as walls, ceiling, etc. as compared to broadband signals. Furthermore, the described information capture process can be performed very rapidly. For example, the entire scene can be scanned and measured at the same time, rather than scanning point by point as in some conventional imaging systems.

The single-frequency imaging system and imaging methods described herein can provide advantages over conventional wide bandwidth microwave imaging systems. The proposed imaging system, referred to throughout the application as "imaging system" provides simplified hardware combined with an efficient signal processing method.

The simplified hardware includes an array antenna with a single feed that serves to excite a waveguide structure. All of the components of the array antenna circuit system can be used with an extremely narrow band or a single frequency, which can then work seamlessly with the signal processing. To perform imaging using a single frequency, or very small bandwidth (i.e., with respect to fractional bandwidth, for example less than 1% of the operating frequency), and resolve objects in all possible directions, many angles of illumination of an object are needed. To do this conventionally, it is necessary to either perform the imaging by mechanically moving the transmit and receive antennas or with a very large array, and also to use a wide bandwidth. The antenna array design of the proposed imaging system replaces the mechanical movement or complex array with a very simple structure that multiplexes all of the constituting array element contributions into a few measurements. An efficient algorithm also increases the speed of image reconstruction. Overall, the imaging system is fast, simple, and efficient in both hardware and software.

Figure 1A:
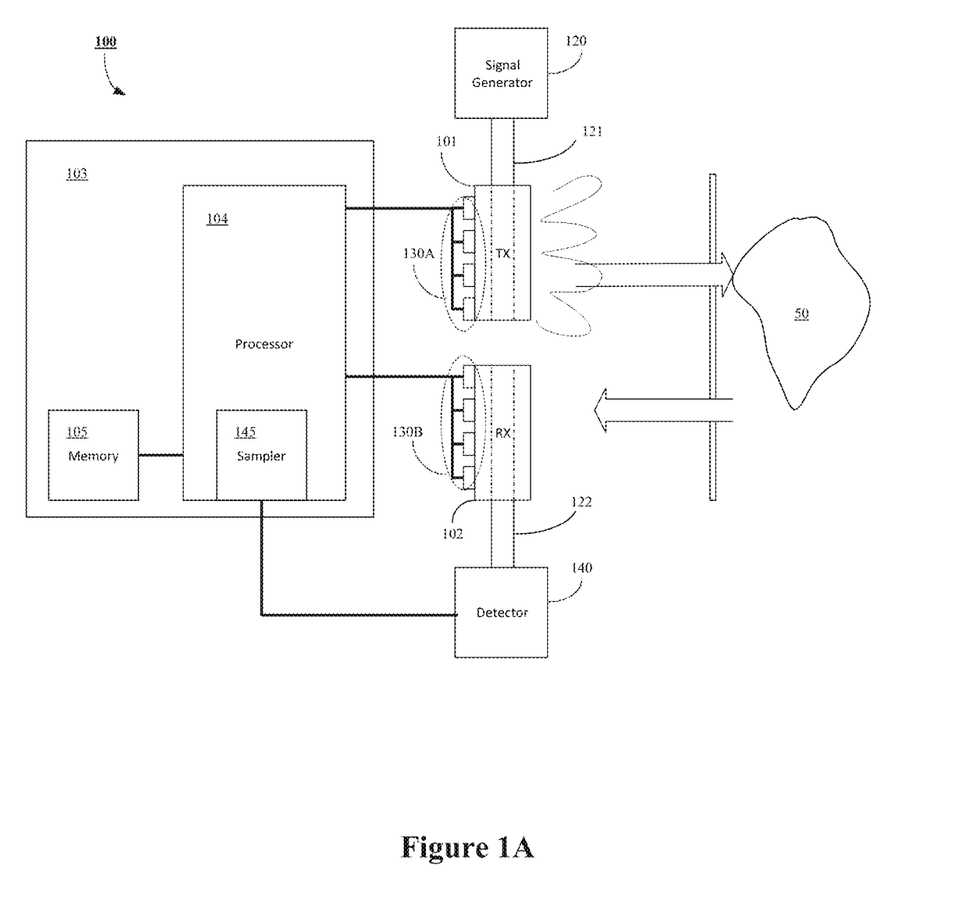
FIG. 1A shows an example of a system level hardware implementation of a single-frequency imaging system.
Figure 1B:
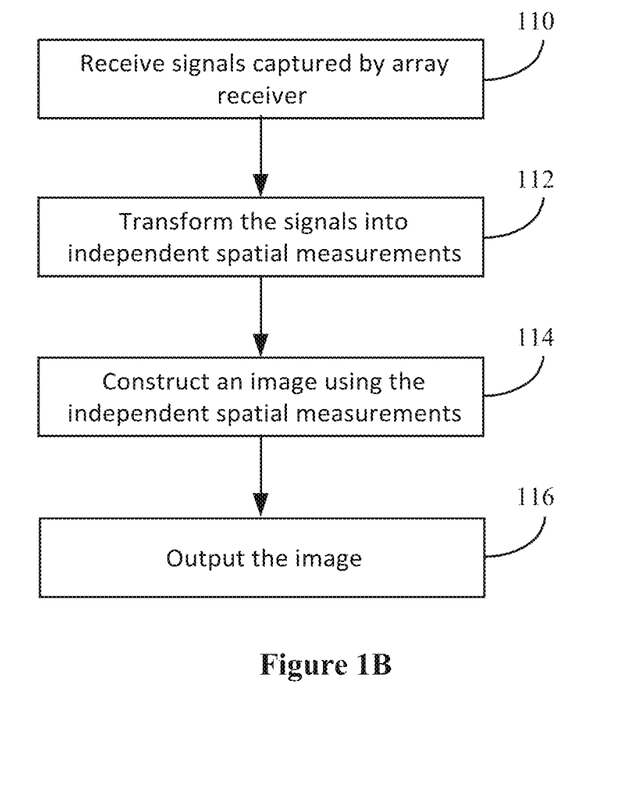
FIG. 1B shows an example signal processing method.

At a high level, the imaging system includes an array transmitter, an array receiver, and a computing device that performs image reconstruction. FIG. 1A shows an example of a system level implementation of a single-frequency imaging system; and FIG. 1B shows an example signal processing method. The microwave imaging system 100 includes an array transmitter 101 that transmits microwave signals to image an object 50, an array receiver 102 that captures reflected or backscattered signals corresponding to the microwave signals transmitted by the array transmitter, and a computing device 103. The array transmitter 101 and array receiver 102 can each be, for example, a dynamically-tunable metasurface array antenna. While the dynamically-tunable metasurface array antenna is discussed in detail herein, other arrays could also be implemented, such as phased arrays or electronically scanned antennas (ESA) or other arrays with tunable components.

The computing device 103 may include components at the transmitter 101 and/or receiver 102, and may also, or as an alternative, include components separate from the transmitter 101 and receiver 102 at a location wired or wirelessly connected to the receiver 102. In some cases, certain components of the computing device 103, such as those carrying out image reconstruction, may simply access stored data received via the receiver 102. In most cases, the computing device 103 includes a processor 104 and memory 105.

As illustrated in FIG. 1B, the computing device can receive (110) signals from the array receiver 102 corresponding to a plurality of patterns generated by the array transmitter 101, transform (112) the signals received by the array receiver into independent spatial measurements, construct (114) an image using the independent spatial measurements, and output (116) a reconstructed image.

Returning to FIG. 1A, in a case where the array transmitter is a metasurface array antenna, the system 100 can include a signal generator 120 to generate a single-frequency, or very small bandwidth, signal in the feeding waveguide 121 of the array transmitter 101. The array transmitter 101 radiates electromagnetic energy using elements within its waveguide 121. Backscattered or reflected signals can be received via the receiver's elements and can be combined within the receiver's waveguide 122.

Metasurface array antennas often take the form of a waveguide or cavity structure that leaks out the contained wave through metamaterial elements. Metasurface antennas can radiate spatially diverse, frequency-indexed patterns or as a function of a tuning signal, in order to multiplex a scene's spatial information. In general, a large aperture needs to be generated to achieve excellent image reconstruction. A dynamically-tunable metasurface array can provide a way to make a large aperture inexpensively. Additionally, the simplified hardware of the metasurface array antenna can result in the transfer of much of the computation and image reconstruction to the software side as compared to conventional systems.

Each element within the waveguides 121, 122 can be independently controlled by corresponding control circuitry 130A, 130B. In some cases, the patterns used by the control circuitry 130A, 130B are selected or generated by the computing device 103 via processor 104. Further, the transmit and receive patterns may be the same or different patterns.

Figure 2:
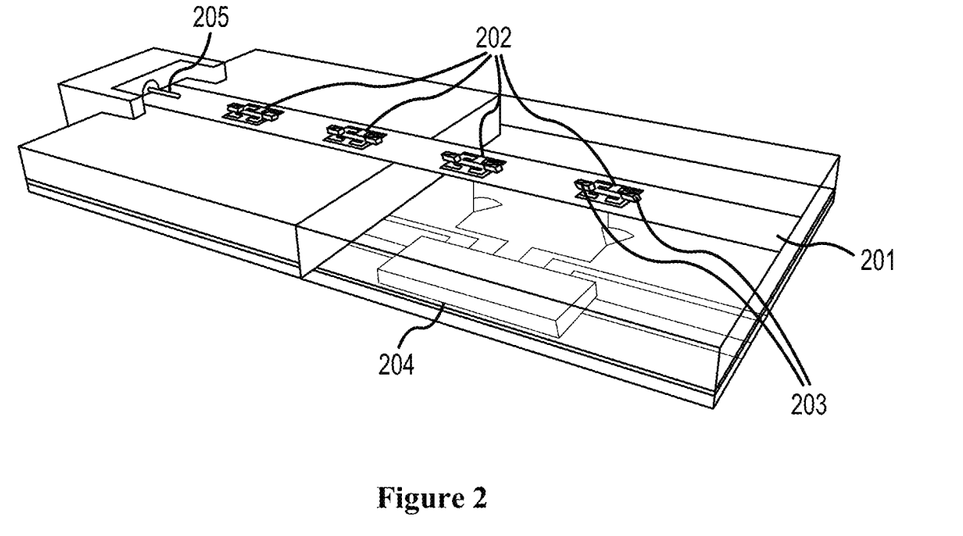
FIG. 2 shows a schematic of an example implementation of a dynamically-tunable metasurface array antenna.

FIG. 2 shows a schematic of an example implementation of a dynamically-tunable metasurface array antenna 200. The same type of array can be used for both transmission and reception. In the example implementation of FIG. 2, a dynamic metasurface antenna 200 includes a microstrip waveguide 201. The microstrip waveguide 201 contains a collection of individually addressable metamaterial elements 202 that are individual radiators. The metamaterial elements 202 are all fed from one feeding structure, which is a waveguide that originates at a single point or at a collection of points. A large aperture is achieved through the feed structure of the antenna 200. Each element 202 can have two PIN diodes 203 (or other tunable component(s)). The resonant frequency of each individual element 202 can be varied by the application of an external voltage to the respective PIN diodes 203. When other tunable components are used instead of PIN diodes, external voltage, current, or electric fields may be applied as suitable for that particular tunable component. Additional components to the antenna include control circuitry 204 and a signal source port 205.

At the start of the imaging process, an electrical signal is generated at a signal source (e.g., signal generator 120 of FIG. 1A). The source can be, for example, a standard network analyzer or a custom-built voltage-controlled oscillator. The signal is transmitted within the waveguide 201 from the signal source port 205. An electromagnetic (EM) field is generated inside the waveguide 201, and that EM field travels down the waveguide 201 and excites, or stimulates, the individual metamaterial elements 202. For the example implementation, the size of the elements and spacing of the elements are both subwavelength. Each of the metamaterial elements 202 can be tuned to a radiating or non-radiating state (binary operation) using the voltage-driven PIN diodes 203 integrated into each metamaterial element. Thus, each element can be independently tuned. Each element can be independently tuned using control circuitry 204. For example, the tunable components (e.g., PIN diodes 203, varactors, transistors, or other semiconductor devices) for each element are electrically connected to the control circuitry 204. The control circuitry 204 may include shift registers, decoupling stubs, resistors, diodes, and biasing circuits. In some cases, row and column decoders may be included.

Tuning the resonance frequency of each element influences the amplitude and phase of radiation emitted from that point, generating spatially distinct radiation patterns. The spatially distinct radiation patterns multiplex a scene's cross-range content without requiring a large frequency bandwidth. An important factor when performing imaging using a small frequency bandwidth, or even single frequency, is to operate within the Fresnel zone of an electrically large aperture, where electromagnetic fields exhibit variation along the range and cross-range directions, allowing the spatial frequencies in both directions to be sampled with no bandwidth.

Figure 3:
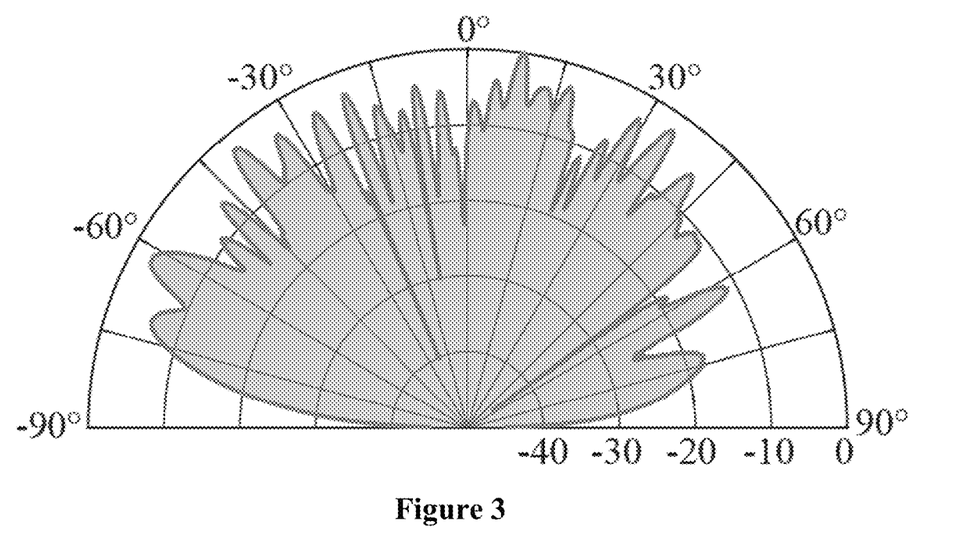
FIG. 3 shows an example of a spatially diverse far-field pattern from a dynamic metasurface array.

FIG. 3 shows an example of a spatially diverse far-field pattern from a dynamic metasurface array. The radiation pattern shown in FIG. 3 can be generated using the individually addressable metamaterial elements along a microstrip waveguide of a transmitter. By tuning the resonance frequency of each element in the transmitter, the amplitude and phase of radiation emitted from that point can be controlled, the spatially distinct radiation pattern is generated. Through generating multiple distinct radiation patterns, a scene's cross-range content can be multiplexed without requiring a large frequency bandwidth.

Many possible radiation patterns can be generated, and the patterns can be chosen based on efficiency. For example, a set of patterns can be used in which the number of elements is chosen to maintain power requirements, while retaining randomness of the patterns. Depending on the application, a collection of radiation patterns can be generated either randomly or for a specific purpose. A certain number of radiation patterns is used based on the amount of information required to be obtained. In this imaging process, different views of the objects of interest, or different information about a scene, can be obtained by tuning the elements on the transmit (Tx) and/or receive (Rx) side and changing the radiation patterns. This information capture process can be performed very rapidly. Additionally, the entire scene can be scanned and measured at the same time, rather than scanning point by point as in some conventional imaging systems.

Figure 4A:
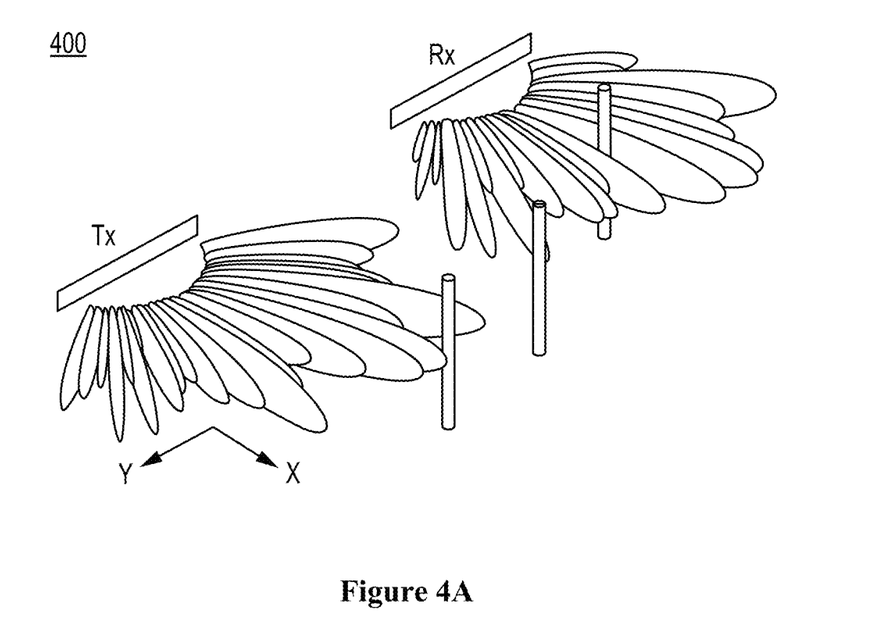
FIGS. 4A and 4B illustrate the concept of implementing multiple radiation patterns used to sample an object.
Figure 4B:
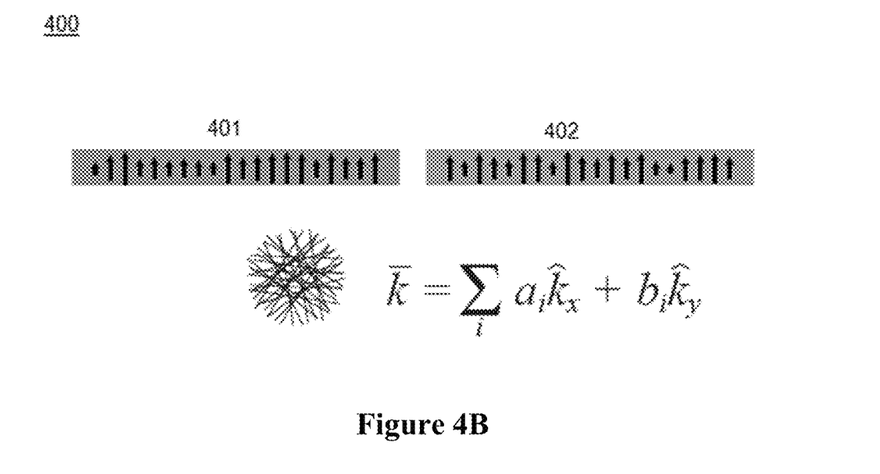

FIGS. 4A and 4B illustrate the concept of implementing multiple radiation patterns used to sample a scene of interest. FIG. 4A illustrates an electrically large, linear transmit-receive aperture using dynamic metasurface arrays for the transmit aperture and receive aperture. The radiation patterns shown in FIG. 4A represent a set of random patterns for both the transmit radiation patterns and receive radiation patterns. FIG. 4B shows a multiplexing aperture configuration for sampling of the transmit radiation patterns and receive radiation patterns for the dynamic metasurface array in the spatial frequency domain, or k-space. The transmit pattern is shown in representation 401 and the receive pattern is shown in element 402. In this multiplexing configuration, sources across the entire waveguide aperture are shown by arrows and are simultaneously radiating. Operation within the Fresnel zone (defined as distances greater than $2\lambda$ and less than $2D^2/\lambda$ where D is the size of the antenna and $2\lambda$ is the free space wavelength of the operating frequency) is assumed for this illustration. Accordingly, the k-components in range and one cross-range dimension can be probed from a one-dimensional aperture (i.e., waveguide) radiating a series of distinct patterns at a single frequency. In addition, larger portions of the required k-space can be sampled in each measurement; and the radiation patterns can be modulated to illuminate the scene (and be collected).

Returning to FIG. 1A, the transmit radiation patterns combine in the region of interest where objects are located in a scene, for example object 50. The combined radiation patterns create random structured illumination patterns and illuminate objects in a scene. The illumination patterns scatter upon hitting the objects. Backscatter measurements are collected by the array receiver 102. The backscatter measurements contain encoded scene information over a set of measurements that can be postprocessed to reconstruct an (range and cross-range) image.

Once the backscattered signals are received by the array receiver 102, a reciprocal event occurs. Since the array receiver is also a dynamically-tunable metasurface array antenna, the receive elements can be tuned in the same manner as the array transmitter (i.e., resonating or non-resonating). Each of the receive elements takes in energy. The received energy combines inside of the waveguide 122, and then all received energy travels through the waveguide 122 to an origination point in the waveguide and combine together. The combined energy can be measured by the detection circuitry 140, which can be associated with a sampling device, or "sampler", 145.

That is, the radiation received in the waveguide 122 of the array receiver 102 can be detected via detection circuitry 140. The sampler 145 samples the detected signal to obtain a phase and a magnitude of the received signal.

For example, the energy measurements can be folded back into a vector network analyzer (VNA), custom radio, or some other conventional hardware. The detection circuitry may include, for example, filters and other conventional and generic hardware components. A variety of detection methods can be employed, such as, but not limited to voltage detection, current detection, or power detection. In some cases, the detector 140 and the sampler 145 may be integrated as the same device. In some cases, the detector 140 and the sampler 145 are separate devices. In some cases, the sampler 145 can be part of the processor 104 or be a component of the computing device 103.

The sampler 145 can produce raw complex numbers that represent the phase and magnitude of the received signal. One complex number is produced per combination of the transmit (illumination) pattern and the receive (backscatter) pattern. For every single combination of transmit and receive patterns, a different measurement is taken. The measurements thus correspond to the radiation patterns, which as mentioned above may be random or some other configuration. The complex numbers are collected and stored in the memory storage 105 within the computing device 103. The computing device 103 can be, for example, a personal computer (PC), laptop, tablet, network server, or other computing device. Once a sufficient amount of the signal measurements is collected, an image reconstruction process can begin running on the entire collection. The amount of measurements taken can be chosen depending on the application. In some cases, the entire collection of measurements may not be needed or desired.

Image reconstruction from the large collection of complex numbers can be a difficult and intensive process. An efficient image reconstruction method is described herein.

Figure 5A:
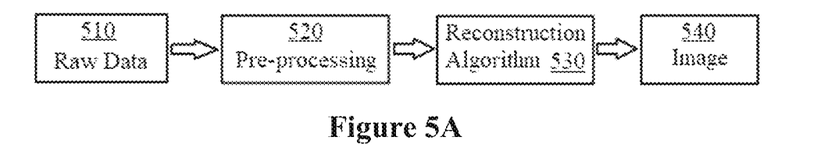
FIG. 5A shows a process flow for reconstruction of an image

As shown in FIG. 5A, a process flow for reconstruction of an image can include receiving raw data 510 detected by detection circuitry from an array receiver, pre-processing the raw data 520, and then performing a reconstruction algorithm 530 on the pre-processed data to reconstruct an image 540.

In one example implementation, the simplified image reconstruction method (e.g., reconstruction algorithm 530) uses range migration techniques, which employ, for example, fast Fourier transforms (FFT) to rapidly invert a signal represented in k-space. Conventional range migration techniques assume simple, dipolar antenna configuration. To make the range migration techniques, such as the range migration algorithm (RMA), compatible with the dynamic metasurface array, a pre-processing step (operation 520) can be performed.

The pre-processing step 520 can be used to make the RMA and dynamic metasurfaces compatible. Instead of having all the elements radiating at the same time, the pre-processing step mathematically models the signal so that one element is radiating at a time (e.g., emulates a particular radiation pattern in which a single element is operated at a time) and then cycles through all the elements one at a time. This pre-processing can be performed after the simultaneous measurements have been taken. However, the signal can be re-represented as if one element was radiating at one time. Additionally, since the signals are operated on with, for example, an FFT, the signals can be considered as a plane wave decomposition. The scene can be illuminated from many different angles, or looks, with the effective plane waves. This allows for discernment both in the azimuth, or left-right direction, and in the range direction to obtain range information (e.g., how far away the image is located from the antenna). This is somewhat unusual because, typically, a wide bandwidth is required to obtain the range information. However, range information can be obtained from the many look angles, which are due to the large size of the array antenna. The output of the pre-processing step corresponds to the signal between a single element of the transmitter and a single element of the receiver.

The pre-processing step 520 transforms the data obtained by the complex numbers (representing the radiation patterns) into independent spatial measurements. In the present embodiment, where two distinct metasurface antennas are used as the transmitter and receiver, the pre-processing step is applied independently for each metasurface antenna. The input to the pre-processing step is the large collection of complex numbers that correspond to the random radiation patterns of the transmitter and random radiation patterns of the receiver. The total number of independent spatial measurements is equal to the number of elements on the transmitter multiplied by the number of elements on the receiver. The raw data (e.g., 510), which is a single complex number for each tuning state pair, is inserted into a matrix G.

For a single tuning state, the effective source distribution on the aperture plane can be represented as a [1×N] row vector with the entries being the discretized sources. By cycling through P tuning states, the effective sources can be stacked to obtain a [P×N] matrix Φ, which represents the linear combinations that make up the radiating aperture. An inverse (or pseudo-inverse when P≠N) is then used to diagonalize the matrix of measurements and find the contributions for each source location. The procedure is carried out through a singular value decomposition (SVD) with a truncation threshold, the latter technique eliminating subspaces that grow toward infinity and corrupt the data during inversion. The transformed signal $s_0$ (as processed from the raw G matrix) is thus $$s_o = \Phi_{Tx}^+ G (\Phi_{Rx}^+)^T \quad (1)$$

where $$\Phi_{Tx} = U_{Tx} \Lambda_{Tx} V_{Tx}^* \quad (2)$$

is the SVD of the transmitter's source matrix and $$\Phi_{Tx}^+ = V_{Tx} \Lambda_{Tx}^+ U_{Tx}^* \quad (3)$$

is its pseudo-inverse. Within these equations, + stands for the pseudo-inverse operator, * is the conjugate transpose operator, and T stands for the transpose operator. The SVD entails splitting Φ into two unitary matrices, U and V*, and a diagonal matrix, Λ, which includes the singular values. All singular values falling below 1% of the largest singular value are truncated. The same is done for the receiver. Using the pre-processing step simplifies the reconstruction from having an array (of tunable elements) fed from a single source to the simpler, yet equivalent, case of multiple, independent arrays (or tunable elements) being fed from multiple sources. The process in Eq. (1) mathematically reverts the single-input single-output (SISO) problem back to the simplest physical situation, which is the multiple-input multiple-output (MIMO) case, where each pair of positions on the Tx and Rx apertures are sampled separately, but allows for a simpler hardware to carry out the process in a faster, more practical implementation.

Figure 5B:
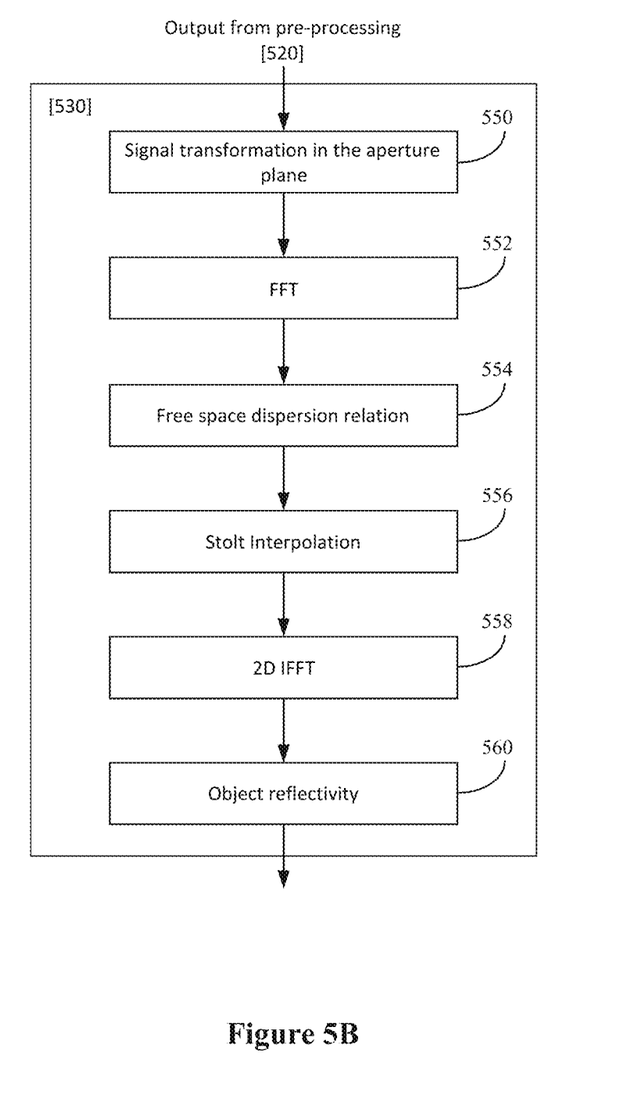
FIG. 5B shows an example RMA adapted for dynamic metasurface arrays.

Once the pre-processing is completed, the RMA can begin. FIG. 5B shows an example RMA adapted for dynamic metasurface arrays. From the SVD inversion in the pre-processing step 520, decoupled spatial contributions $s_0(y_t, y_r)$ can be obtained along the aperture (550). Once the signal is transformed in the aperture plane (550), the decoupled spatial contributions can be represented in the spatial frequency domain by taking the Fourier transform (552) as $$s_0(k_{yt}, k_{yr}) = \Sigma_{y_t} \Sigma_{y_r} s_0(y_t, y_r) e^{j(k_{yt} y_t + k_{yr} y_r)}. \quad (4)$$

After completing a phase compensation, invoking a stationary phase approximation, and accounting for the physically offset locations of the two apertures, the signal can be expressed as $$S_M(k_{yt}, k_{yr}) = S_0(k_{yt}, k_{yr}) e^{-jk_{yt} y_{t0}} e^{-jk_{yr} y_{r0}} e^{jk_y y_0} e^{jk_x x_C}, \quad (5)$$

where $(x_C, y_C)$ is the center of a scene, $y_{t0}$ and $y_{r0}$ are the central locations of the transmitting and receiving apertures, and the k-components are defined in accordance with the free space dispersion relation (554). Specifically, the spatial frequency components combine as $k_x = k_{xt} + k_{xr}$ (and similarly for $k_y$) and $k_{xt} = \sqrt{k^2 - k_{yt}^2}$ (and similarly for $k_{xr}$), where $k_x$ is the wavenumber component along the x direction, $k_{xr}$ is the receiver's contribution, $k_{xt}$ is the transmitter's contribution x is the range direction, y is the cross-range. Thus, the first two exponentials account for the locations of the apertures and the last two exponentials compensate to reference the phase with respect to the center of the scene.

Because $S_M(k_{yt}, k_{yr})$ is defined on an irregular grid, it must be resampled onto a regular grid to use the traditional FFT to reconstruct the spatial representation of the scene. The Stolt interpolation (556) is a process that resamples k-space data onto a uniform grid, and the regularly sampled data are $S_f(k_x,k_y)$. After completion of the resampling using Stolt interpolation, the 2D inverse Fourier transform (IFFT) is performed (558) to retrieve the reflectivity of the object (560). After completion of the resampling, the image can be efficiently found as $$\hat{\sigma}(x,y) = \mathcal{F}_{2D}^{-1}[S_f(k_x,k_y)]. \quad (6)$$

Figure 6A:
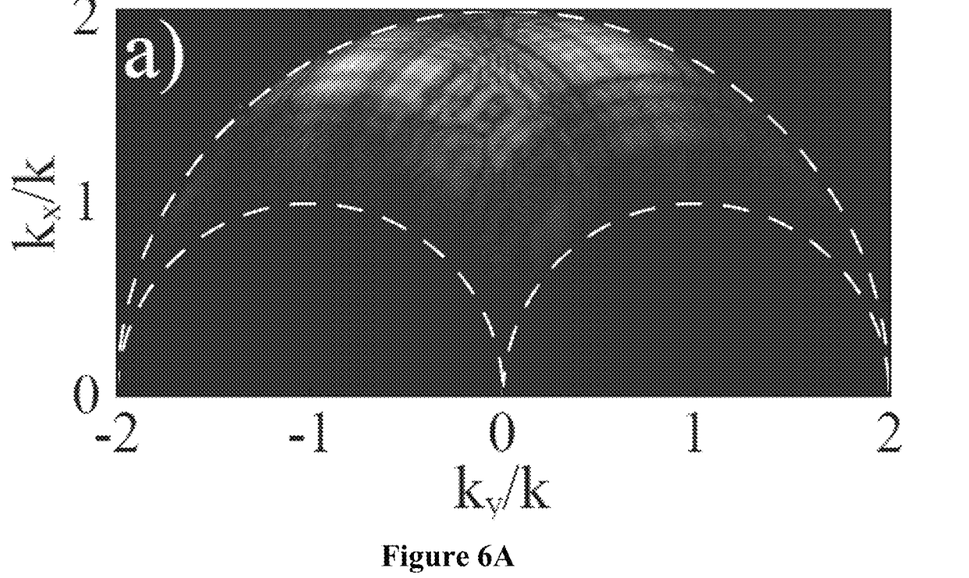
FIGS. 6A and 6B show an example of a reconstructed image after the final two steps of the reconstruction process.
Figure 6B:
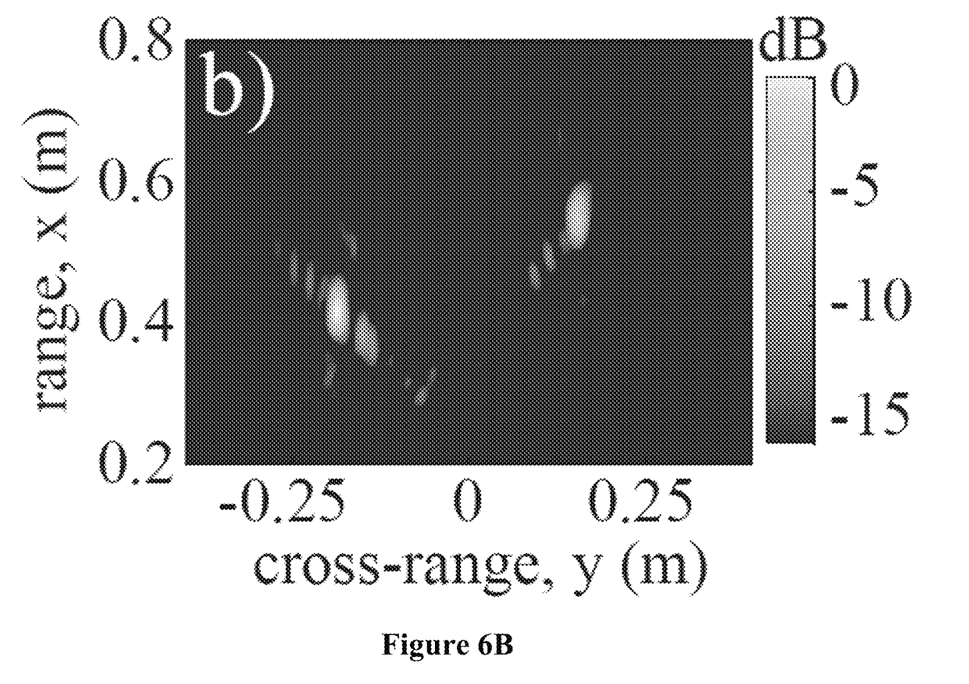

FIGS. 6A and 6B show an example of a reconstructed image after the final two steps of the reconstruction process. The signal interpolated onto a regular grid, $S_f$, is shown in FIG. 6A. Note that all signals should fall within the outlined region because the components outside are evanescent and will not contribute to imaging. For the signal in FIG. 6A, generated from two scatterers in the scene, the inversion has been completed, and the result is shown in FIG. 6B.

While the RMA discussed herein employs the FFT, other techniques, such as, but not limited to a nonuniform Fourier transform, can also be used.

In another example implementation of an image reconstruction method, pre-processing may be omitted. Instead, all raw data from the sampler (e.g., sampler 145 of FIG. 1A) can be fed into a large matrix equation and solved. A sensing matrix, H, is calculated based on the fields projected from the array transmitter and array receiver. By formulating the forward model of the Tx/Rx fields with the scene's reflectivity, $\sigma$, the set of measurements, g, can be represented as $$g = H\sigma, \quad (7)$$

where the quantities are discretized based on the diffraction limit. The measurement column vector g is composed of the entries of the matrix G with order given by the indexing of the tuning states, which can be represented as $(a_P, b_q)$. Assuming the Born approximation (weak scatterers), entries of H are written as the dot product $$H_{ij} = \bar{E}_{Tx}^i(\bar{r}_j) \cdot \bar{E}_{Rx}^i(\bar{r}_i). \quad (8)$$

The quantities $\bar{E}_{Tx}^i$ and $\bar{E}_{Rx}^i$ are, respectively, the electric fields of the Tx and Rx dynamic metasurface apertures for the ith tuning state combination. With the two apertures, this index is essentially counting the pairs $(a_1, b_1), (a_1, b_2), \ldots, (a_1, b_P), (a_2, b_1), \ldots, (a_P, b_P)$. The $\bar{r}_j$'s are the positions in the region of interest, resulting in each row of the H matrix representing the interrogating fields for all locations in the scene for a given tuning state, $(a_P, b_q)$. To reconstruct the scene reflectivity, Eq. (7) must be inverted to find an estimate of the scene $\hat{\sigma}$. Since H is generally ill-conditioned, this process must be completed with computational techniques such as matched filtering or least-squares solver such as GMRES.

The image reconstruction method is performed using a processor within a computing device. The processor can be any processing unit, such as, but not limited to a computer, or FPGA. The processing unit can be a high-level processor or a low-level processor.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of a transitory, propagating, signal.

Experimental Examples

Figure 7A:
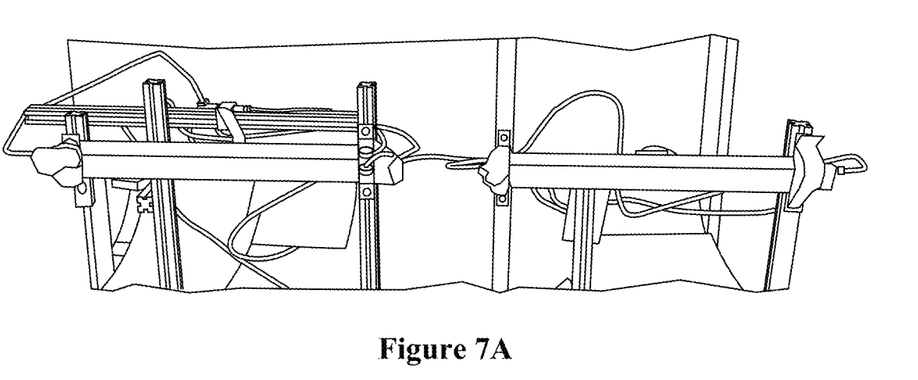
Figure 7B:
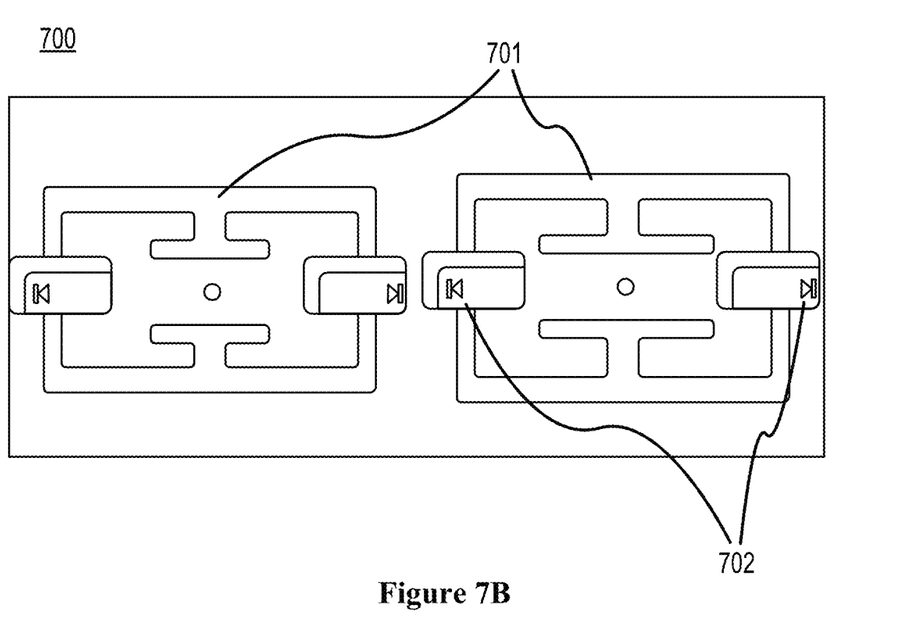
Figure 7C:
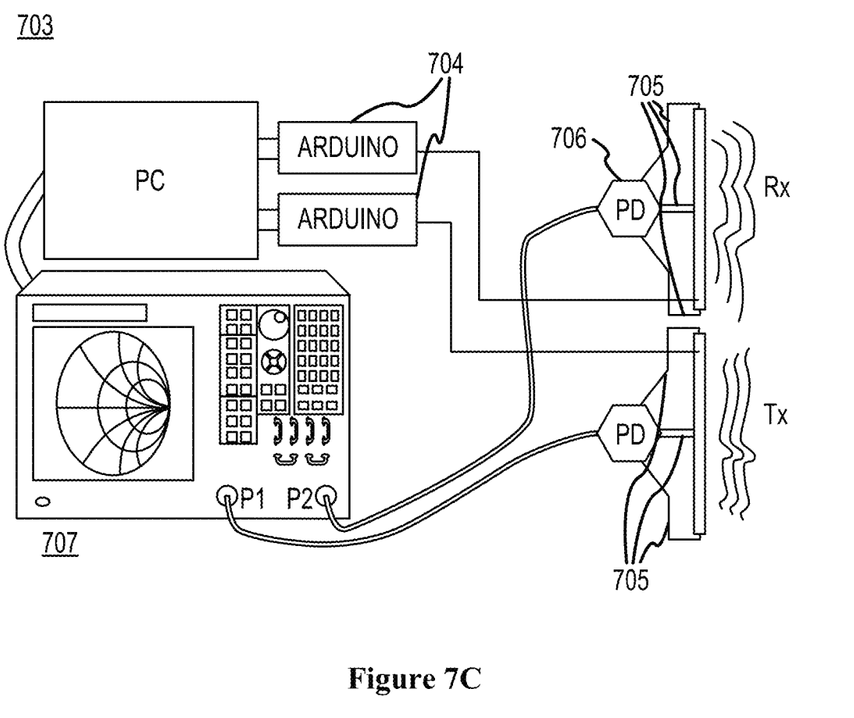
FIG. 7C shows an example schematic of a system configuration.

FIGS. 7A and 7B show an example implementation of a dynamically tunable metasurface array for both transmit and receive. FIG. 7A shows an example experimental setup for the single-frequency imaging. FIG. 7B shows an example of an array 700 that consists of a 40-cm long microstrip line that excites 112 metamaterial elements 701. The metamaterial elements 701 are complementary electric-LC (cELC) resonators, with every other element having resonance frequencies 17.8 GHz and 19.2 GHz (covering the lower part of K band). Each element 701 is loaded with two PIN diodes 702 (MACOM MADP-000907-14020 W) and is individually addressed using an Arduino microcontroller, which applies a DC voltage bias. The microstrip line is excited through a center feed (which generates two counterpropagating waves) and two edge feeds (each creating a single propagating wave) to ensure ample signal stimulation of all of the elements. The edge feed can be seen in FIG. 2 as 201, and the connectors for the end launch and the central launch are Southwest Microwave 292-04A-5 and 1012 23SF, respectively. FIG. 7C shows an example schematic of the system configuration 703 with the Arduinos 704, feed lines 705, and power dividers 707 (PD).

The signal injected into the aperture is distributed through and carried by the waveguide, but the structure is effectively a single port device since a single RF signal is inserted/collected. The combination of the transmitter and receiver thus creates a SISO system but emulates the performance of a MIMO system because tuning the elements enables multiplexing the transmitted/received signal into a single feed.

In this sense, the device retains simplicity in RF circuitry (only needing one feed, and allowing the RF components to be designed around a single frequency) but with the addition of the DC tuning circuitry. This DC circuitry, composed of shift registers, decoupling stubs, and resistors, is vastly simpler than the design that goes into creating a broadband RF source/detector circuit that is used in combination with a large conventional array antenna, such as a phased array.

The resulting radiation pattern generated from this single port antenna is the superposition of the contributions from each constituting element. By turning each element on or off using the PIN diodes, the radiation pattern can be modulated without active phase shifters or moving parts. By leveraging the resonant behavior of the metamaterial elements, the phase and magnitude of each radiator can be changed and can manipulate the radiation pattern.

The imaging setup includes two similar arrays placed side by side with 20 cm in between (edge-to-edge), as shown in FIG. 7A. As shown in FIG. 7B, the array transmitter is connected to Port 1 (P1) of an Agilent E8364c vector network analyzer (VNA) 707 and the array receiver is connected to Port 2 (P2) of the VNA. The RF signal on each side is distributed with a power divider 706 to excite all three feed points 705, simultaneously generating four traveling waves with equal magnitude. Each array is addressed separately using distinct Arduino microcontrollers 704. The DC control signals sent from the Arduinos are distributed to each independent element through a series of shift registers, enabling different on/off combinations of elements at any time. The microcontrollers and VNA are controlled via MATLAB.

To characterize one of the dynamic metasurfaces, its near field is scanned for different tuning states using a reference antenna. The scanned data is then used along with the surface equivalence principle to represent the aperture as a set of discrete, effective sources. These sources can then be propagated to arbitrary locations in the scene, a process completed for both the transmit aperture and the receive aperture. The subwavelength metamaterial elements have mutual coupling, which affects the overall radiation pattern, but these contributions (as well as any fabrication tolerances) are all captured in this experimental characterization and thus do not pose a problem.

During the imaging process the VNA is set to measure a single frequency, 19.03 GHz, which provides ample SNR and diverse patterns from the aperture. The transmitter's microcontroller enforces a tuning state $a_1$, and then the receiver's microcontroller sweeps through all the characterized tuning states $b_q$, $q=1, \ldots, Q$. The transmitter then moves on to the next tuning state and repeats, continuing this process through $a_p$, $p=1, \ldots, P$ until reaching the final state $a_P$. The raw data, a single complex number for each tuning state pair, is inserted into a [Q×P] matrix G. For the following experiments, Q=P such that the total number of measurements is $P^2$—e.g., for 50 transmitter tuning states and 50 receiver tuning states, 2500 measurements will be taken at a single spectral frequency. It should be noted that the amount of information that a finite aperture can probe is inherently limited by its physical size and the operating frequency. The space-bandwidth product imposes a physical limit on the number of independent free fields that can be generated from any aperture. In this experiment, a larger number of tuning states than is strictly necessary will be used (P=100, compared with the space-bandwidth product, which is 50 based on the antenna's size) to overcome potential correlation among the random patterns.

For each tuning state, a different combination of 30 elements (out of the 112) is chosen at random and set to the on state. Randomness is chosen to ensure low correlation among the radiated patterns. Though a more deliberate set of on/off elements may give a minor enhancement in performance, the random selection process has been shown to provide ample diversity in the patterns. This process is purely electronic and could be accomplished in real-time by using a FPGA in conjunction with a customized RF source/detector.

Figure 8A:
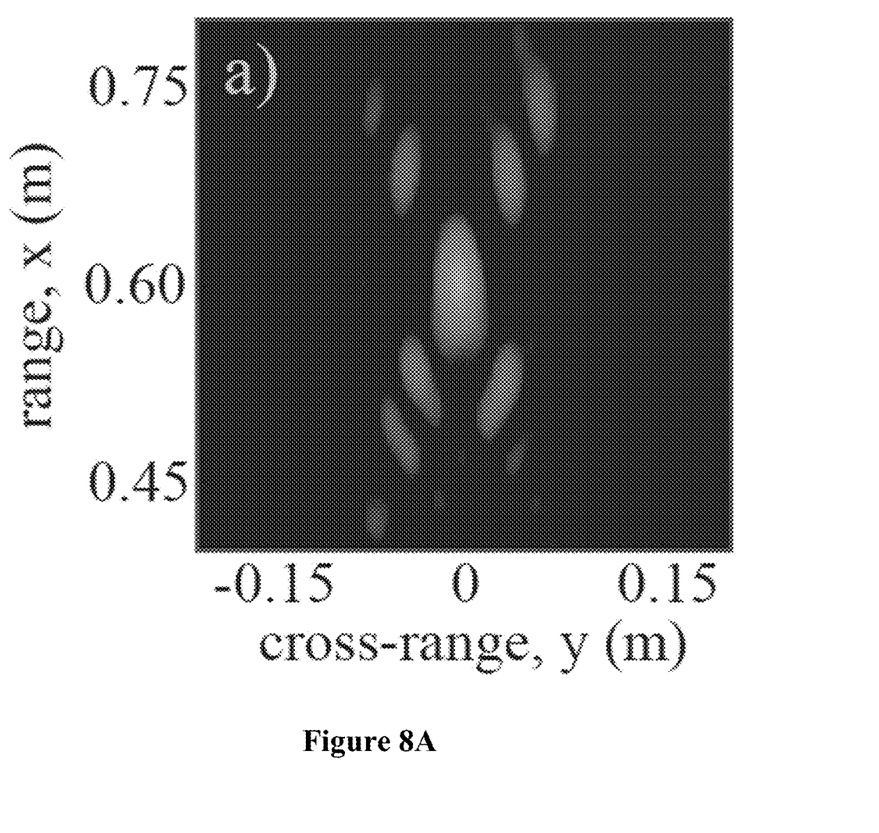
FIGS. 8A-8C show an example of a reconstructed image.
Figure 8B:
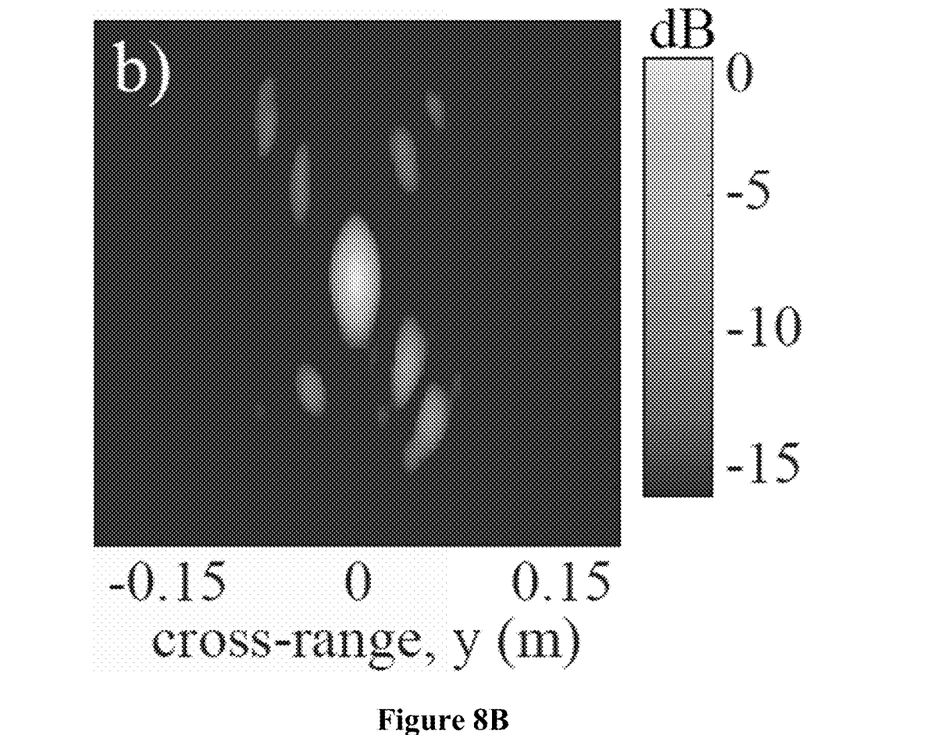
Figure 8C:
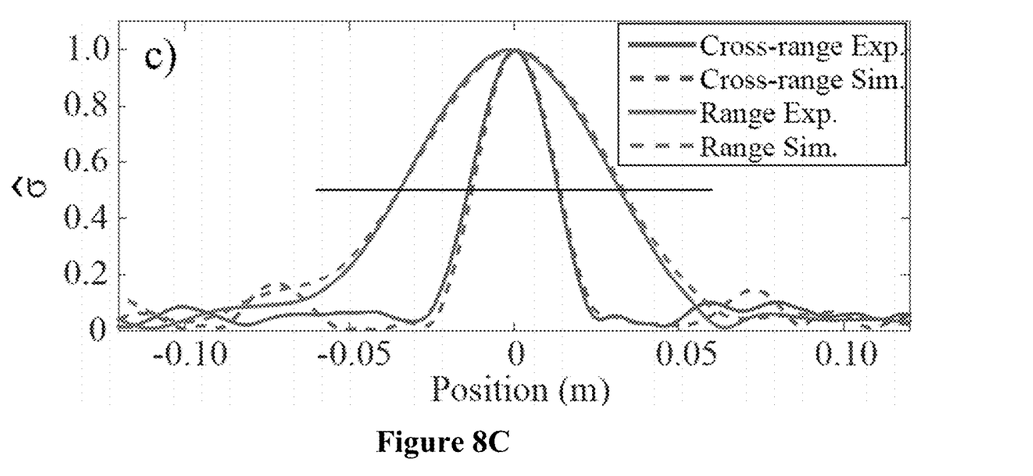

FIGS. 8A-8C show an example of a reconstructed image. The experimental results of a point spread function (PSF) analysis using a metallic rod of diameter 3 mm (a 2D point scatterer) placed at x=0.5 m, y=0 m are shown in FIG. 8A. The simulated results of the PSF are shown in FIG. 8B. For this result, the image was reconstructed using the RMA described above with P=100 tuning states to obtain a high-quality image. FIG. 8C shows slices of this image taken along the major axes, which are used to determine the cross-range and range resolution. The simulated (shown in the dashed line curve) and experimental (shown in the solid line curve) results are plotted together in FIG. 8C.

By comparing the simulated result to the experiment, it is seen that qualitatively similar behavior appears in both reconstructions. The PSF resembles the shape of an "X," due to the geometric placement of the antennas, which is seen in both reconstructions. Additionally, the 1D cross sections show that the expected resolution is met. For the cross-range resolution, the experiment results in 2.7 cm, the numeric simulation returns 2.7 cm, and the analytic expectation gives 1.8 cm. Overall, the agreement between the three cases is reasonable. The experimental PSF shows excellent agreement with the simulated PSF, and it also confirms the expectation that the analytic approach is overconfident. The range result reveals a similar trend. Experimental results show a resolution of 5.3 cm, in contrast to an expectation of 5.3 cm from simulation and 3.4 cm from the analytic result. This good agreement confirms that the configuration matches the expected performance.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
an array transmitter comprising a plurality of subwavelength elements that are each tunable to transmit one or more transmit radiation patterns towards a region of interest from one or more feed signals within a narrow frequency band with respect to a fractional bandwidth of the array transmitter;
an array receiver configured to receive one or more receive radiation patterns from the region of interest in response to the one or more transmit radiation patterns; and
a computing device configured to:
generate one or more images of the region of interest based on the one or more receive radiation patterns;
receive, from detection circuitry, raw data of one or more characteristics of the one or more receive radiation patterns; and
reconstruct the one or more images of the region of interest based on the raw data.

2. The system of claim 1, wherein frequencies in the narrow frequency band are within at most 1% of an operating frequency of the array transmitter.

3. The system of claim 1, wherein the one or more feed signals are at a single frequency within the narrow frequency band.

4. The system of claim 1, wherein the one or more transmit radiation patterns include one or more spatially diverse radiation patterns.

5. The system of claim 1, wherein the array transmitter is configured to operate within a Fresnel zone of the array transmitter.

6. The system of claim 1, wherein the array transmitter is configured to transmit the one or more transmit radiation patterns towards the region of interest to image the entire region of interest at the same time.

7. The system of claim 1, wherein the one or more images of the region of interest include both range content and cross-range content of the region of interest.

8. The system of claim 7, wherein the one or more transmit radiation patterns include a plurality of spatially distinct radiation patterns and the cross-range content of the region of interest is multiplexed using the plurality of spatially distinct radiation patterns.

9. The system of claim 1, wherein the array receiver comprises a plurality of subwavelength elements that are each tunable to receive the one or more receive radiation patterns from the region of interest for generating the one or more images of the region of interest.

10. The system of claim 1, wherein at least a portion of the plurality of subwavelength elements are integrated along a microstrip waveguide configured to feed the one or more feed signals to the at least a portion of the plurality of subwavelength elements.

11. The system of claim 1, wherein the computing device is further configured to:
sample the raw data to identify one or more phases and magnitudes of one or more signals corresponding to the one or more receive radiation patterns and included as part of the raw data; and
reconstruct the one or more images of the region of interest based on the one or more phases and magnitudes of the one or more signals corresponding to the one or more receive radiation patterns.

12. The system of claim 1, wherein the computing device is further configured to:
pre-process the raw data to generate pre-processed raw data; and
reconstruct the one or more images of the region of interest using the pre-processed raw data.

13. The system of claim 12, wherein the computing device is further configured to:
independently apply pre-processing to the raw data corresponding to each subwavelength element of the plurality of subwavelength element of the array transmitter and each subwavelength element of a plurality of subwavelength elements of the array receiver to generate a plurality of independent spatial measurements for the array transmitter and the array receiver; and
reconstruct the one or more images of the region of interest based on plurality of independent spatial measurements.

14. The system of claim 13, wherein the plurality of independent spatial measurements are independent across the plurality of subwavelength elements of the array transmitter and the plurality of subwavelength elements of the array receiver and each spatial measurement of the plurality of independent spatial measurements corresponds to one of the plurality of subwavelength elements of the array transmitter or the plurality of subwavelength elements of the array receiver.

15. The system of claim 1, wherein the computing device is further configured to apply a range migration technique to reconstruct the one or more images of the region of interest based on the raw data.

16. The system of claim 15, wherein the computing device is further configured to:
identify decoupled spatial contributions of the array transmitter and the array receiver based on the raw data;
represent the decoupled spatial contributions in a spatial frequency domain;
define k-space components for the decoupled spatial contributions from representations of the decoupled spatial contributions in the spatial frequency domain; and
resample the k-space components onto a uniform grid to identify reflectivity in the region of interest and reconstruct the one or more images of the region of interest based on the reflectivity in the region of interest.

17. The system of claim 16, wherein the computing device is configured to apply Stolt interpolation to resample the k-space components onto the uniform grid.

18. The system of claim 16, wherein the decoupled spatial contributions are a plurality of independent spatial measurements identified by pre-processing the raw data.

19. The system of claim 1, wherein the computing device is further configured to reconstruct the one or more images of the region of interest directly from the raw data while omitting pre-processing of the raw data to reconstruct the one or more images.

20. The system of claim 19, wherein the computing device is further configured to identify reflectivity in the region of interest for reconstructing one or more images of the region of interest by applying a sensing matrix to the raw data.

21. A method comprising:
transmitting one or more transmit radiation patterns towards a region of interest from an array transmitter comprising a plurality of subwavelength elements that are each tunable to transmit the one or more transmit radiation patterns from one or more feed signals within a narrow frequency band with respect to a fractional bandwidth of the array transmitter;
receiving one or more receive radiation parameters from the region of interest at an array receiver in response to the one or more transmit radiation patterns;
generating one or more images of the region of interest based on the one or more receive radiation patterns;
receiving raw data of one or more characteristics of the one or more receive radiation patterns; and
reconstructing the one or more images of the region of interest based on the raw data.

22. The method of claim 21, wherein frequencies in the narrow frequency band are within at most 1% of an operating frequency of the array transmitter.

23. The method of claim 21, wherein the one or more feed signals are at a single frequency within the narrow frequency band.

24. The method of claim 21, wherein the one or more transmit radiation patterns include one or more spatially diverse radiation patterns.

25. The method of claim 21, wherein the array transmitter is configured to operate within a Fresnel zone of the array transmitter.

26. The method of claim 21, wherein the array transmitter is configured to transmit the one or more transmit radiation patterns towards the region of interest to image the entire region of interest at the same time.

27. The method of claim 21, wherein the one or more images of the region of interest include both range content and cross-range content of the region of interest.

28. The method of claim 27, wherein the one or more transmit radiation patterns include a plurality of spatially distinct radiation patterns and the cross-range content of the region of interest is multiplexed using the plurality of spatially distinct radiation patterns.

29. The method of claim 21, wherein the array receiver comprises a plurality of subwavelength elements that are each tunable to receive the one or more receive radiation patterns from the region of interest for generating the one or more images of the region of interest.

30. The method of claim 21, further comprising:
sampling the raw data to identify one or more phases and magnitudes of one or more signals corresponding to the one or more receive radiation patterns and included as part of the raw data; and
reconstructing the one or more images of the region of interest based on the one or more phases and magnitudes of the one or more signals corresponding to the one or more receive radiation patterns.

31. The method of claim 21, further comprising:
pre-processing the raw data to generate pre-processed raw data; and
reconstructing the one or more images of the region of interest using the pre-processed raw data.

32. The method of claim 31, further comprising:
independently applying pre-processing to the raw data corresponding to each subwavelength element of the plurality of subwavelength element of the array transmitter and each subwavelength element of a plurality of subwavelength elements of the array receiver to generate a plurality of independent spatial measurements for the array transmitter and the array receiver; and
reconstructing the one or more images of the region of interest based on plurality of independent spatial measurements.

33. The method of claim 32, wherein the plurality of independent spatial measurements are independent across the plurality of subwavelength elements of the array transmitter and the plurality of subwavelength elements of the array receiver and each spatial measurement of the plurality of independent spatial measurements corresponds to one of the plurality of subwavelength elements of the array transmitter or the plurality of subwavelength elements of the array receiver.

34. The method of claim 21, further comprising applying a range migration technique to reconstruct the one or more images of the region of interest based on the raw data.

35. The method of claim 34, further comprising:
identifying decoupled spatial contributions of the array transmitter and the array receiver based on the raw data;
representing the decoupled spatial contributions in a spatial frequency domain;
defining k-space components for the decoupled spatial contributions from representations of the decoupled spatial contributions in the spatial frequency domain; and
resampling the k-space components onto a uniform grid to identify reflectivity in the region of interest and reconstruct the one or more images of the region of interest based on the reflectivity in the region of interest.

36. The method of claim 35, further comprising applying Stolt interpolation to resample the k-space components onto the uniform grid.

37. The method of claim 35, wherein the decoupled spatial contributions are a plurality of independent spatial measurements identified by pre-processing the raw data.

38. The method of claim 21, further comprising reconstructing the one or more images of the region of interest directly from the raw data while omitting pre-processing of the raw data to reconstruct the one or more images.

39. The method of claim 38, further comprising identifying reflectivity in the region of interest for reconstructing one or more images of the region of interest by applying a sensing matrix to the raw data.

* * * * *